US009527481B2

(12) United States Patent
Kaminaga et al.

(10) Patent No.: US 9,527,481 B2
(45) Date of Patent: Dec. 27, 2016

(54) VEHICLE WIPER DEVICE

(71) Applicant: Fuji Jukogyo Kabushiki Kaisha, Tokyo (JP)

(72) Inventors: Kazuhiro Kaminaga, Tokyo (JP); Satoru Iwata, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/853,753

(22) Filed: Sep. 14, 2015

(65) Prior Publication Data

US 2016/0090068 A1 Mar. 31, 2016

(30) Foreign Application Priority Data

Sep. 30, 2014 (JP) ................. 2014-199850

(51) Int. Cl.
*B60S 1/48* (2006.01)
*B60S 1/08* (2006.01)
*B60S 1/52* (2006.01)

(52) U.S. Cl.
CPC .............. *B60S 1/481* (2013.01); *B60S 1/0814* (2013.01); *B60S 1/482* (2013.01); *B60S 1/0844* (2013.01); *B60S 1/524* (2013.01)

(58) Field of Classification Search
CPC ......... B60S 1/481; B60S 1/482; B60S 1/0814; B60S 1/08; B60S 1/0896; B60S 1/0807; B60S 1/46; B60S 1/48; B60S 1/524
USPC ....... 15/250.01, 250.02, 250.17; 318/DIG. 2; 239/284.1

See application file for complete search history.

(56) References Cited

U.S. PATENT DOCUMENTS 4,720,664 A * 1/1988 Iwamoto ................. B60S 1/482
15/250.17
7,748,075 B2 * 7/2010 Nakano ................... B60S 1/486
15/250.02

FOREIGN PATENT DOCUMENTS

| DE | 102012210894 | * | 1/2014 |
| FR | 2950589 | * | 4/2011 |
| JP | H 05-097017 A | | 4/1993 |
| JP | H5-185908 A | | 7/1993 |
| JP | 2008-006971 A | | 1/2008 |
| JP | 2014-201190 A | | 10/2014 |
| JP | 2015-137007 A | | 7/2015 |

OTHER PUBLICATIONS

JPO Decision to Grant a Patent dated Jun. 7, 2016 with an English translation thereof.

(Continued)

*Primary Examiner* — Gary Graham
(74) *Attorney, Agent, or Firm* — McGinn IP Law Group, PLLC.

(57) ABSTRACT

A vehicle wiper device includes: a first blade having an operating range that includes an upper mid region of a vehicle windshield; a second blade having an operating range that includes a lower region of the operating range of the first blade; a cleaning-liquid feeding unit; a blade driving unit that causes each blade to reciprocate; and a controller that controls operation of the cleaning-liquid feeding unit and operation of the blade driving unit. The controller performs the control such that, after a series of normal operation in which the first blade and the second blade reciprocate while ejecting the cleaning liquid has been completed, additional movement operation is performed in a state where feeding of the cleaning liquid from the cleaning-liquid feeding unit is stopped.

2 Claims, 3 Drawing Sheets

(56) References Cited

OTHER PUBLICATIONS

JPO Notification of Reason for Refusal dated Dec. 8, 2015 with an English translation thereof.

* cited by examiner

VEHICLE WIPER DEVICE

CROSS-REFERENCE TO RELATED APPLICATIONS

The present application claims priority from Japanese Patent Application No. 2014-199850 filed on Sep. 30, 2014, the entire contents of which are hereby incorporated by reference.

BACKGROUND

1. Technical Field

The present invention relates to vehicle wiper devices. In particular, the present invention relates to a vehicle wiper device equipped with a blade having a cleaning-liquid ejecting function.

2. Related Art

A vehicle wiper device is used as a device that cleans the surface of a vehicle windshield by wiping off rainwater and dirt therefrom. The vehicle wiper device is provided with a blade at a moving end of a pivot arm and reciprocates this blade on the surface of the windshield so as to wipe and clean the windshield.

Furthermore, in order to make the wiping-cleaning function more effective, a mechanism that feeds and ejects a cleaning liquid onto the surface of the windshield is also provided. In recent years, a configuration that ejects the cleaning liquid directly from the blade is used so as to eject the cleaning liquid to a more appropriate position or region of the windshield.

For example, Japanese Unexamined Patent Application Publication No. 05-97017 discloses a wiper blade having a structure that sprays the cleaning liquid toward the glass surface. According to this technique, a packing member normally provided to blade rubber serving as the blade body has a cleaning-liquid feed passage. Thus, it is not necessary to provide an additional tube or spray nozzle, thereby achieving a simplified structure as well as a facilitated manufacturing process.

In the case where the blade itself has a cleaning-liquid ejecting function as in the related art technology described above, the cleaning liquid can be ejected relatively uniformly and to appropriate positions over a wide range of the windshield. However, because the blade normally moves in a substantially circular pattern in a state where there is always a substantial amount of cleaning liquid in front of the blade in the moving direction thereof, the cleaning liquid tends to splatter outward in the radial direction of the moving region of the blade due to the effect of a centrifugal force generated as a result of the movement of the blade.

In particular, with regard to a blade (i.e., a second blade) having a moving region that includes a region below an upper mid region of the windshield, the cleaning liquid may become pushed out to the upper mid region of the windshield as the second blade moves. Then, the cleaning liquid pushed out to the upper mid region of the windshield can no longer be wiped off with the second blade.

Thus, until a blade (i.e., a first blade) with a moving region that includes the upper mid region of the windshield performs subsequent wiping operation, the cleaning liquid remains in the upper mid region. For ensuring good forward visibility, this state in which the cleaning liquid remains in the upper mid region of the windshield is not preferred since the cleaning liquid may subsequently drip downward and remain in the main region of the windshield.

Furthermore, in recent years, some vehicles are equipped with a function that captures an image of the conditions ahead and assists in driving based on the captured data. In such vehicles, since an image capturing device, such as a camera, is disposed in the upper mid region of the windshield, the state where the cleaning liquid remains therein may adversely affect the function of the image capturing device.

FIG. 5 illustrates a problem in a vehicle having image capturing devices, such as cameras, disposed in the upper mid region of a windshield 100. Specifically, FIG. 5 illustrates how a cleaning liquid 26 splattering from a reciprocating second blade 14 in the radial direction thereof (indicated by an arrow 220) enters a specific region 18 on the windshield 100, which is a region including the field angle of image capturing devices 16-1 and 16-2. In this state in which the cleaning liquid 26 remains in the specific region 18, the function of the image capturing devices 16-1 and 16-2 is adversely affected.

Therefore, in a blade having a cleaning-liquid ejecting function, there is a challenge to prevent the cleaning liquid from remaining in the upper mid region of the windshield as much as possible.

SUMMARY OF THE INVENTION

In view of the challenge mentioned above, an object of the present invention is to provide a vehicle wiper device equipped with a blade having a cleaning-liquid ejector, in which the vehicle wiper device can effectively prevent a cleaning liquid from remaining in a main region and an upper mid region of a windshield.

In order to achieve the aforementioned object, an aspect of the present invention provides a vehicle wiper device including a first blade having an operating range that includes an upper mid region of a vehicle windshield; a second blade having an operating range that includes a lower region of the operating range of the first blade; a cleaning-liquid feeding unit that feeds a cleaning liquid to an ejector so as to eject the cleaning liquid onto the windshield; a blade driving unit that causes each blade to reciprocate within the corresponding operating range on the windshield; and a controller that controls operation of the cleaning-liquid feeding unit and operation of the blade driving unit. The controller controls the cleaning-liquid feeding unit and the blade driving unit such that, after a series of normal operation in which the first blade and the second blade reciprocate while ejecting the cleaning liquid has been completed, additional movement operation is performed in a state where feeding of the cleaning liquid from the cleaning-liquid feeding unit is stopped.

The controller may perform the control such that the additional movement operation is performed by either one of the first blade and the second blade or by both the first blade and the second blade at different timings.

When the controller causes the first blade to perform the additional movement operation, the controller may perform the control such that a moving range of the first blade in the movement operation is set to be larger than a moving range of the first blade in the normal operation.

The controller may perform the control such that the feeding of the cleaning liquid is stopped only during a returning motion in the additional movement operation.

DETAILED DESCRIPTION

A vehicle wiper device according to an example of the present invention will be described in detail below with reference to the drawings.

Figure 1:
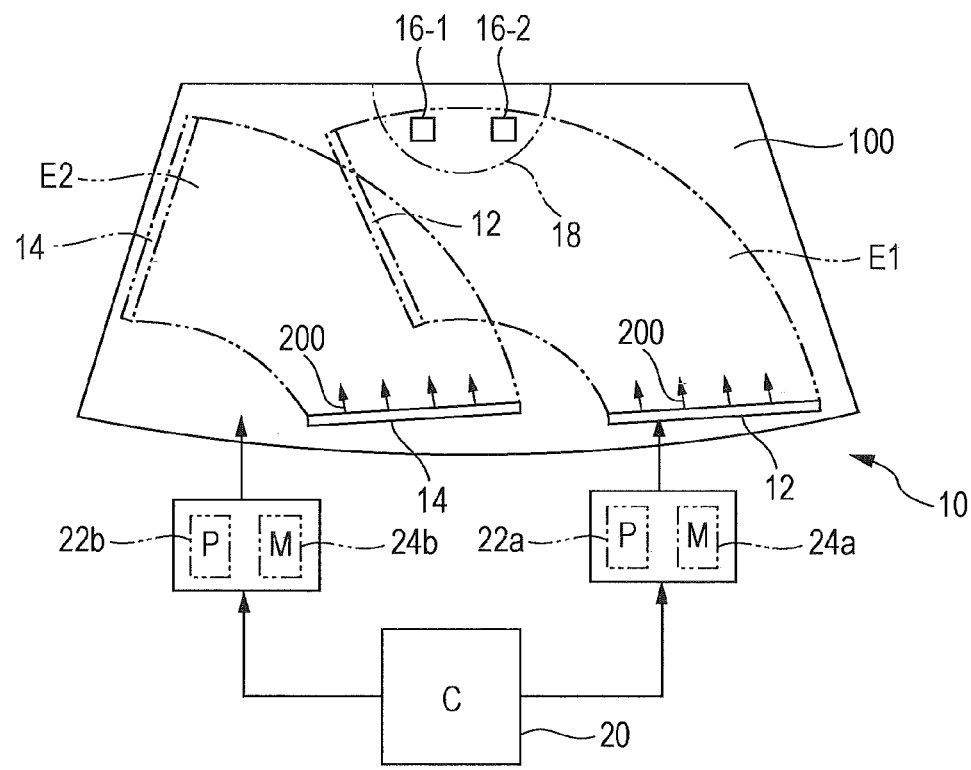
FIG. 1 is a schematic configuration diagram of a vehicle wiper device according to an example of the present invention.

FIG. 1 is a schematic configuration diagram of a vehicle wiper device 10 according to an example of the present invention and illustrates a front windshield 100 of a vehicle with a right-hand steering wheel, as viewed from the outside. As illustrated in FIG. 1, on the windshield 100, a first blade 12 is provided at the passenger-seat side, which is the right side in FIG. 1, and a second blade 14 is provided at the driver-seat side, which is the left side. Although the left and right sides are inverted in the case of a vehicle with a left-hand steering wheel, a description thereof will be omitted below.

Each of the blades 12 and 14 is attached to an end of a pivot arm (not illustrated) and pivots back and forth within a predetermined range in accordance with operation of the pivot arm. An operating area E1 of the first blade 12 includes an upper mid region of the windshield 100, and an operating area E2 of the second blade 14 includes a region below the upper mid region of the windshield 100. The operating area E1 and the operating area E2 partially overlap each other.

A pair of cameras 16-1 and 16-2 as image capturing devices that are used for checking the conditions ahead is disposed at the inner side of the windshield 100. A region 18 indicated by a two-dot chain line in FIG. 1 corresponds to a field angle that is a photographic range of the cameras 16-1 and 16-2. Hereinafter, the region 18 is referred to as "the specific region 18". Based on image information acquired with these cameras 16, the presence of, for instance, an object ahead and the distance thereto are detected and determined, such that control for assisting in driving of the vehicle is performed.

Furthermore, in the vehicle wiper device 10 according to this example, each of the blades 12 and 14 has a cleaning-liquid ejector (not illustrated) that ejects a cleaning liquid in a direction indicated by arrows 200 in FIG. 1. The cleaning liquid is ejected by causing ejection pumps 22a and 22b controlled by a controller 20 to feed the cleaning liquid to the blades 12 and 14. In one example, a cleaning-liquid feeding unit may refer to the entire configuration that includes the ejection pumps 22a and 22b and that feeds the cleaning liquid retained in a cleaning-liquid tank (not illustrated) to the cleaning-liquid ejectors of the blades 12 and 14.

The pivot operation of the pivot arms (not illustrated) that bring the aforementioned blades 12 and 14 into operation is performed by drive motors 24a and 24b similarly controlled by the controller 20. Specifically, with regard to each of the blades 12 and 14, the pivot operation thereof is independently controlled, and the ejection of the cleaning liquid is also independently performed. In one example, a blade driving unit may refer to the overall configuration that includes the drive motors 24a and 24b and that makes the pivot arms pivot.

For instance, by individually changing the outputs of the drive motors 24a and 24b, the operating speeds of the blades 12 and 14 can be controlled. Moreover, by individually changing the pressures of the ejection pumps 22a and 22b, the cleaning-liquid ejection amounts can be adjusted.

The controller 20 includes a central processing unit (CPU), a read-only memory (ROM), and so on and is capable of independently or synchronously controlling the first blade 12 and the second blade 14, as described above.

Figure 2:
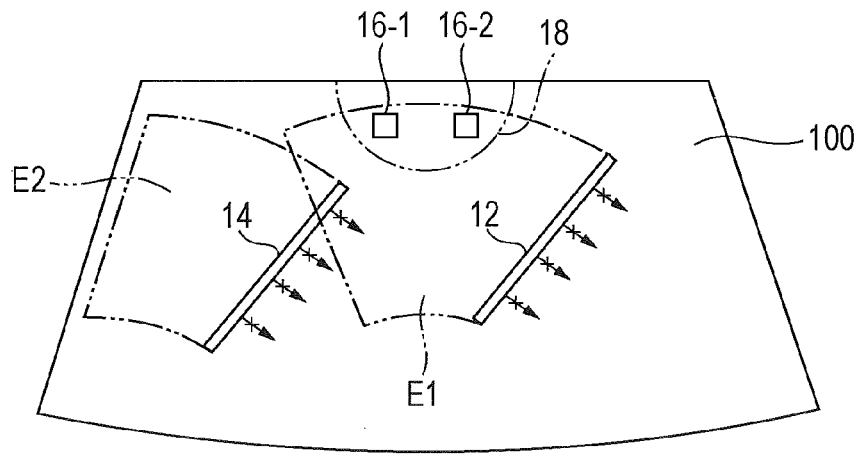
FIG. 2 illustrates a state where a first blade and a second blade are being additionally moved while ejection of a cleaning liquid therefrom is stopped in the vehicle wiper device in FIG. 1.

FIG. 2 illustrates the first blade 12 and the second blade 14 being additionally moved in a state where the feeding of the cleaning liquid from the cleaning-liquid feeding unit is stopped, after a series of normal operation in which the first blade 12 and the second blade 14 reciprocate while ejecting the cleaning liquid has been completed. The state illustrated in FIG. 2 corresponds to a returning motion in the additional movement operation. In this additional movement operation, the cleaning liquid is not fed to the first blade 12 and the second blade 14 such that the ejection of the cleaning liquid is stopped.

The operating range of the first blade 12 includes the upper mid region of the windshield 100. The operating range of the second blade 14 includes a lower region of the operating range of the first blade 12. Therefore, by additionally moving the first blade 12 and the second blade 14 in the state where the ejection of the cleaning liquid is stopped, the upper mid region and the main region of the windshield 100 are wiped. Because the upper mid region includes the specific region 18 that includes the field angle of the cameras 16-1 and 16-2, the cleaning liquid and so on remaining in the specific region 18 are wiped off as a result of the additional movement operation of the first blade 12, whereby the function of the image capturing devices can be ensured. Furthermore, with the additional movement operation of the second blade 14, the main region of the windshield 100, particularly, the windshield at the driver-seat side, is wiped, thereby maintaining good visibility. Accordingly, when the first blade 12 and the second blade 14 return to their accommodation positions (i.e., lower pivot positions), a good state is achieved in which there is hardly any remains, such as the cleaning liquid, on the windshield 100.

Although the additional movement operation of the first blade 12 and the second blade 14 is performed while stopping the ejection of the cleaning liquid, it is also possible to stop the ejection of the cleaning liquid only during the returning motion in the additional movement operation. Depending on the state of the windshield 100, it may be not necessary to reciprocate the blades while stopping the ejection of the cleaning liquid. Instead, there may be a case where it is sufficient to stop the ejection of the cleaning liquid only during the returning motion, and such a case can be dealt with in accordance with this example of the present invention.

Figure 3:
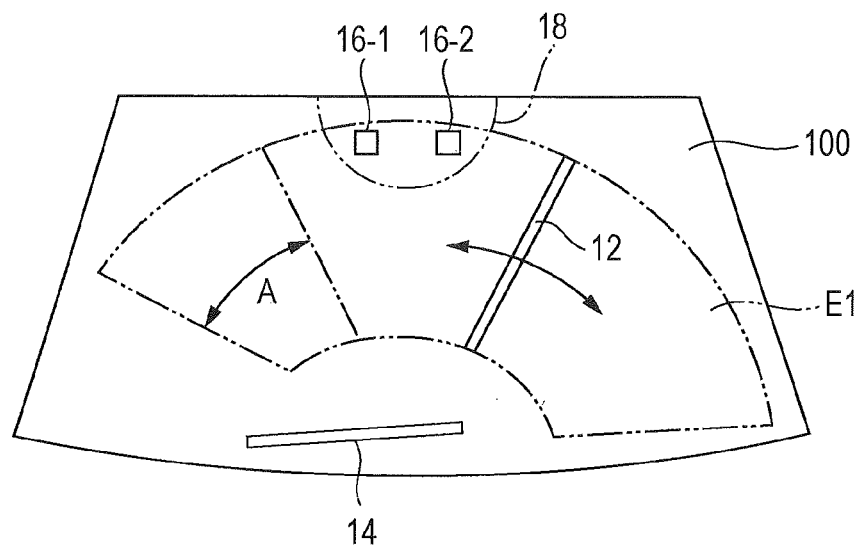
FIG. 3 illustrates a state where the first blade is being additionally moved in the vehicle wiper device in FIG. 1.

FIG. 3 illustrates a state where the first blade 12 is reciprocated after a series of normal operation in which the first blade 12 and the second blade 14 reciprocate while ejecting the cleaning liquid has been completed. The first blade 12 is reciprocated once. As illustrated in FIG. 3, the first blade 12 reciprocates over a larger moving range than in the normal operation of the first blade 12. In FIG. 3, a region expanded from that in the normal reciprocating operation is indicated by an arrow A. By expanding the moving range in this manner, the main region of the windshield 100, particularly, the cleaning liquid and so on remaining at the driver-seat side, can be wiped over a wider range, thereby maintaining good forward visibility of the vehicle.

In this case, the first blade 12 reciprocates at a moving speed that is the same as that during the normal reciprocating operation thereof. However, the moving speed is appropriately changeable depending on the condition of the cleaning liquid and so on remaining on the windshield 100. Furthermore, as mentioned above, the ejection of the cleaning liquid may be stopped only during the returning motion in the additional movement operation.

Accordingly, because the first blade 12 having an operating range that includes the specific region 18 corresponding to the field angle of the image capturing devices is additionally moved while the ejection of the cleaning liquid is stopped, the cleaning liquid and so on remaining in the specific region 18 and the main region of the windshield 100 can be appropriately wiped off.

Figure 4:
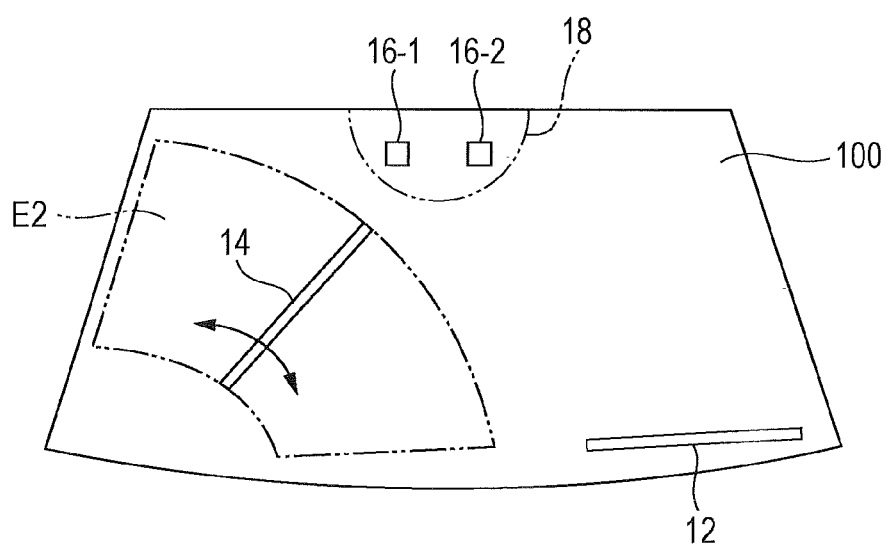
FIG. 4 illustrates a state where the second blade is being additionally moved in the vehicle wiper device in FIG. 1.
Figure 5:
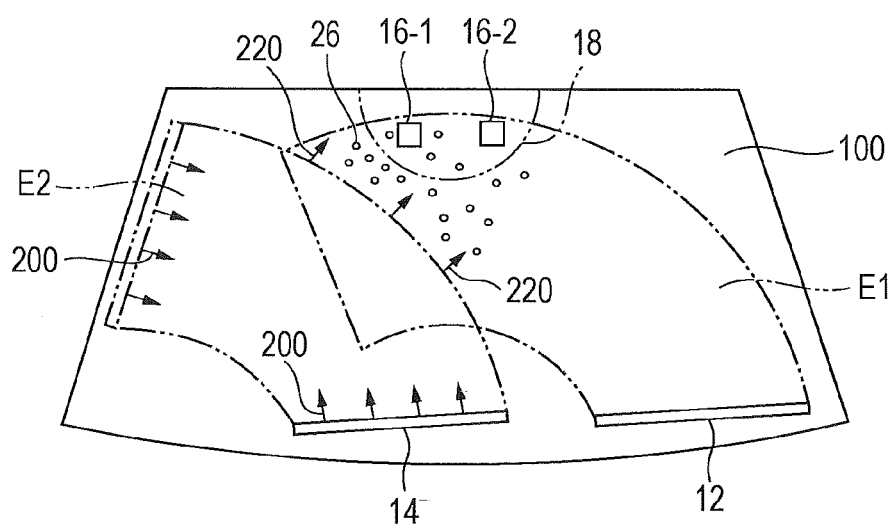
FIG. 5 illustrates a problem in a vehicle having image capturing devices, such as cameras, disposed in an upper mid region of a windshield.

FIG. 4 illustrates a state where the second blade 14 is additionally reciprocated after a series of normal operation in which the first blade 12 and the second blade 14 reciprocate while ejecting the cleaning liquid has been completed. The second blade 14 is reciprocated once. This additional reciprocation of the second blade 14 is preferably performed upon completion of the additional reciprocation of the first blade 12. Specifically, it is preferable to perform control such that the first blade 12 and the second blade 14 perform their additional reciprocation at different timings. The moving speed of the second blade 14 during this reciprocation is the same as the moving speed thereof in the normal operation. However, the moving speed is appropriately changeable depending on the condition of the cleaning liquid and so on remaining on the windshield 100. Furthermore, as mentioned above, in the additional movement operation of the second blade 14, the ejection of the cleaning liquid may be stopped only during the returning motion.

Accordingly, by additionally reciprocating the second blade 14, the cleaning liquid and so on remaining on the windshield 100 at the driver-seat side can be appropriately wiped off, thereby ensuring good forward visibility of the vehicle and facilitating safe driving.

In the vehicle wiper device 10 according to this example, after a series of normal operation in which the first blade 12 and the second blade 14 reciprocate while ejecting the cleaning liquid has been completed, the additional movement operation is performed in a state where the feeding of the cleaning liquid from the cleaning-liquid feeding unit is stopped. The additional movement operation is performed by both the first blade 12 and the second blade 14, by either one of the first blade 12 and the second blade 14, or by both the first blade 12 and the second blade 14 at different timings. Accordingly, the cleaning liquid and so on may be prevented from remaining in the specific region 18 corresponding to the field angle of the image capturing devices 16-1 and 16-2 and in the main region of the windshield 100, thereby maintaining the function of the image capturing devices and also ensuring good forward visibility of the vehicle.

The present invention is not limited to the scope described in the above-described example, and various modifications are possible within the scope of the invention. For example, although the moving speed of the first blade 12 during the additional movement operation is the same as the moving speed during the normal operation thereof, the moving speed may be changed in accordance with the condition of the windshield 100, the vehicle speed, and so on. Furthermore, although the first blade 12 is reciprocated once, the number of times the first blade 12 is reciprocated may be set in accordance with the condition of the windshield 100. The same applies to the reciprocation of the second blade 14.

Furthermore, although each blade has a cleaning-liquid ejector in the above description, the example of the present invention is also applicable to a vehicle in which the ejector is provided at a location other than each blade.

The invention claimed is:
1. A vehicle wiper device comprising:
a first blade having an operating range that includes an upper mid region of a vehicle windshield;
a second blade having an operating range that includes a lower region of the operating range of the first blade;
a cleaning-liquid feeding unit that feeds a cleaning liquid to an ejector so as to eject the cleaning liquid onto the windshield;
a blade driving unit that causes each blade to reciprocate within the corresponding operating range on the windshield; and
a controller that controls operation of the cleaning-liquid feeding unit and operation of the blade driving unit,
wherein the controller controls the cleaning-liquid feeding unit and the blade driving unit such that, after a series of normal operation in which the first blade and the second blade reciprocate while ejecting the cleaning liquid has been completed, additional movement operation is performed by either one of the first blade and the second blade or by both the first blade and the second blade at different timings in a state where feeding of the cleaning liquid from the cleaning-liquid feeding unit is stopped, and
wherein when the controller causes the first blade to perform the additional movement operation, the controller performs the control such that a moving range of the first blade in the movement operation is set to be larger than a moving range of the first blade in the normal operation.

2. A vehicle wiper device comprising:
a first blade having an operating range that includes an upper mid region of a vehicle windshield;
a second blade having an operating range that includes a lower region of the operating range of the first blade;
a cleaning-liquid feeding unit that feeds a cleaning liquid to an ejector so as to eject the cleaning liquid onto the windshield;
a blade driving unit that causes each blade to reciprocate within the corresponding operating range on the windshield; and
a controller that controls operation of the cleaning-liquid feeding unit and operation of the blade driving unit,
wherein the controller controls the cleaning-liquid feeding unit and the blade driving unit such that, after a series of normal operation in which the first blade and the second blade reciprocate while ejecting the cleaning liquid has been completed, additional movement operation is performed by either one of the first blade and the second blade or by both the first blade and the second blade at different timings in a state where the feeding of the cleaning liquid is stopped only during a returning motion in the additional movement operation, and
wherein when the controller causes the first blade to perform the additional movement operation, the controller performs the control such that a moving range of the first blade in the movement operation is set to be larger than a moving range of the first blade in the normal operation.

\* \* \* \* \*